Patented May 13, 1952

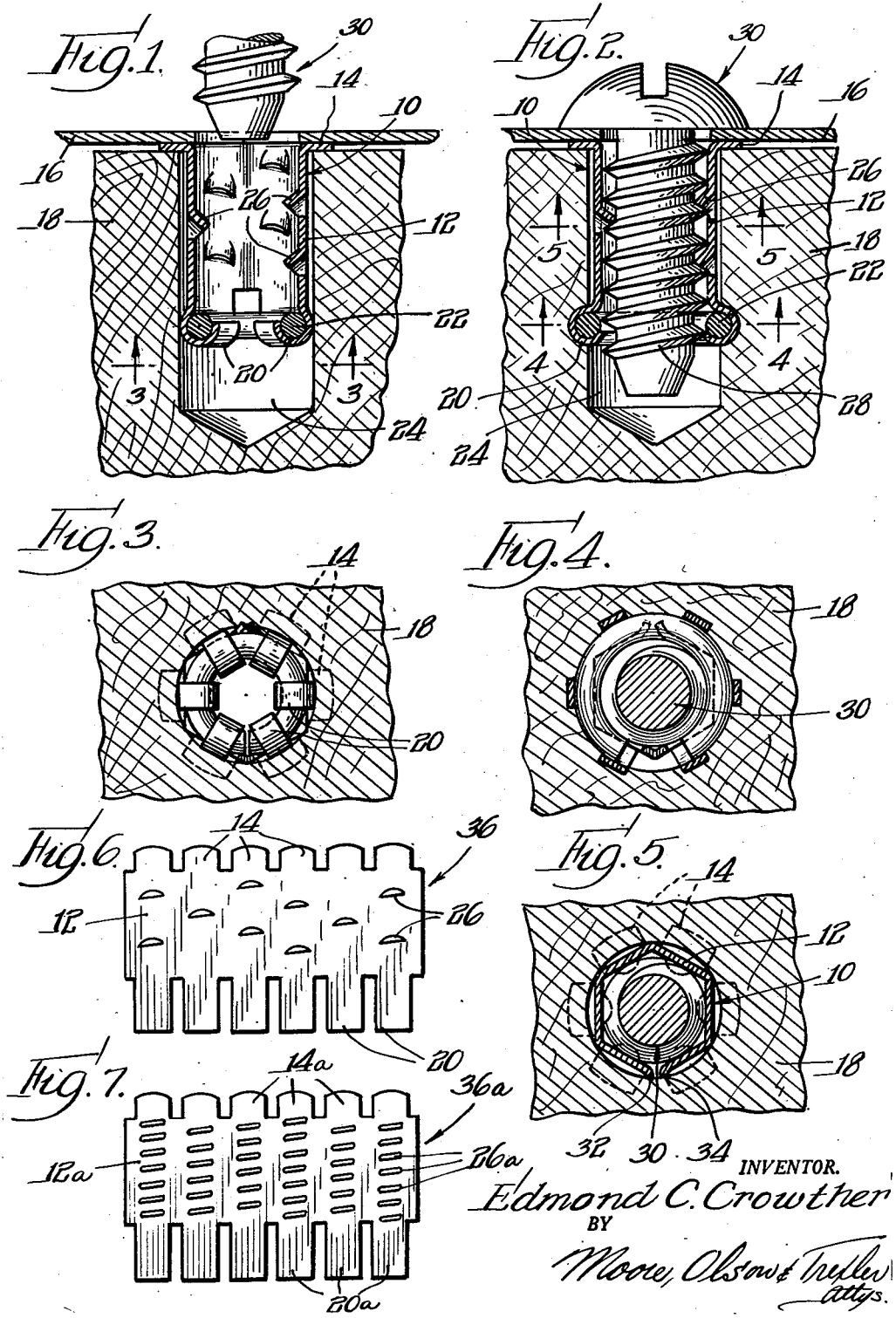

2,596,952

UNITED STATES PATENT OFFICE 2,596,952

EXPANSION INSERT

Edmond C. Crowther, Philadelphia, Pa., assignor to Illinois Tool Works, Chicago, Ill., a corporation of Illinois Application May 18, 1950, Serial No. 162,677

4 Claims. (Cl. 85—2.4)

This invention relates generally to expansion type inserts, and more particularly to sheet metal expansion type inserts adapted to accommodate a screw member and designed to be expanded at its entering extremity as an incident to the application of a screw member.

The present invention contemplates an expansion type insert which may be produced from sheet metal stock at minimum cost and by practicing conventional stamping and forming methods. To this end the invention proposes a sheet metal insert which may be produced from a single blank of sheet metal stock.

More specifically, it is an object of the present invention to provide a sheet metal insert of the type referred to above, wherein improved means is provided at the entering extremity of a sheet metal shank to facilitate expansion of the shank as an incident to the application of a complemental screw member. The invention contemplates the employment of an expansible ring member in association with the entering extremity of a sheet metal insert.

It is a further object of the present invention to provide the above mentioned sheet metal insert, wherein the shank portion is secured against relative rotation with respect to an apertured work piece, and the inner periphery of the shank is formed with helically disposed elements designed to operatively coact with the thread helices of a complemental screw.

The foregoing and other objects and advantages will be more apparent from the following detailed description, when considered in connection with the accompanying drawing, wherein—

Fig. 1 discloses an expansion type insert which is representative of one embodiment of the invention, said insert being shown in central longitudinal cross-section after it has been driven into a work aperture but prior to the insertion of a complemental screw member;

Fig. 2 is a view similar to Fig. 1 after the screw member has been applied to the sheet metal insert so as to expand the entering end thereof and thereby secure a work sheet in place;

Fig. 3 is a transverse sectional view taken substantially along the line 3—3 of Fig. 1;

Fig. 4 is a transverse sectional view taken substantially along the line 4—4 of Fig. 2;

Fig. 5 is a transverse sectional view taken substantially along the line 5—5 of Fig. 2;

Fig. 6 illustrates a blank from which the sheet metal insert disclosed in Figs. 1 to 5 may be formed; and Fig. 7 discloses a slightly modified blank employing a series of indentations, as distinguished from the struck out portions illustrated in Fig. 6, for accommodating the thread helices of a complemental screw member.

Referring now to the drawing more in detail wherein like numerals are employed to designate similar parts throughout the various figures, it will be seen that one embodiment of the present invention contemplates a sheet metal expansion type insert designated generally by the numeral 10. This fastener member 10 includes a elongated shank portion 12 which in the present embodiment is polygonal or hexagonal in cross-section. At one extremity of the shank 12 is a head structure consisting of a plurality of radially extending tabs 14 designed to bear against the outer surface of a work sheet 16 for the purpose of holding said work sheet against another work part such as a wooden structure 18. The opposite extremity of the shank 12 includes an expandable section comprised of a plurality of circumferentially disposed inwardly bent fingers 20. These fingers partially encircle and support a split ring or wire 22.

It is to be noted that the normal external diameter of the fastener in the vicinity of the expandable fingers 20 is approximately equal to, or slightly less than, the internal diameter of the aperture 24 in the wooden work piece 18. The shank portion 12 is also provided with struck out sections 26 which are helically distributed along and extend inwardly from the internal periphery of the shank to coact with the thread helix 28 of a complemental screw member 30.

It will be noted that when the shank 12 of the expansion insert 10 is initially inserted within the work aperture 24, the corners along the outer periphery of the shank will bite into the wall which defines the aperture 24, and thereby secure the insert against rotation within the work piece 18. Also, the opposed adjacently positioned margins of the blank from which the insert is formed, namely, the margins 32—34, Fig. 5, are adapted to bite into the wall defining the work aperture 24.

After the insert 10 has been forced into the aperture 24, it is then in a position to accommodate the fastening screw 30. In the drawing the work sheet 16 is apertured to accommodate the screw 30, and as the screw is rotatably inserted within the shank 12, the thread helices 28 thereof coact with and are guided by the helically disposed struck out elements 26. The internal diameter of the entering portion of the shank 12 is less than the external diameter of the screw thread. Thus, as the screw approaches its final tightening position shown in Fig. 2, the expandable entering extremity of the shank is forced radially outwardly so as to cause the resilient fingers 20 to become embedded within the work piece 18.

In Fig. 6 a blank designated generally by the numeral 36 is shown from which the insert 10 may be formed. That is to say, the main portion of the blank is bent to form the hexagonal shank, the tabs 14 are bent radially outwardly to provide the head section, and the fingers or tabs 20 are bent inwardly to form a seat for the split ring 22.

In Fig. 7 a slightly modified blank 36a is shown. This blank is similar in all respects to the blank 36 of Fig. 6 except that instead of employing struck out sections, such as the sections 26, a series of indentations 26a are formed. When the blank 36a is formed into a hexagonal shank, these indentations 26a, like the struck out sections 26, are disposed in helical alignment to accommodate the thread helices of a complemental screw.

From the foregoing it will be apparent that the present invention contemplates a spring type fastener of extremely simple and practical construction. The sheet metal insert may be produced from a single piece of sheet metal stock, and a split ring may be mounted upon the inner periphery of the entering end of the shank. The split ring provides a positive or firm abutment for the screw threads, and thus insures uniform expansion of the entering end of the insert.

While for purposes of illustration an insert has been disclosed designed specifically for accommodating a coarse pitch screw thread, it will be apparent that modifications or changes to accommodate screw threads of varying pitch may be made without departing from the spirit and scope of the present invention.

The invention is hereby claimed as follows:

1. A two piece screw accommodating expansion insert of sheet metal having a hollow shank portion, a head structure at one extremity thereof, an expansible section at the opposite extremity, and a split metallic ring member mounted on and supported by the expansible portion of the shank; said ring member having a normal internal diameter less than the maximum diameter of a complemental screw and adapted to be expanded as a unit with the expansible shank section to effect locking impingement against the wall defining a complemental work aperture, whereby to anchor said insert in a work piece as an incident to the reception of a screw, said expansible shank section having means for securing said split ring against axial separation from the entering extremity of said insert, and means on the interior of said shank for operatively coacting with the thread helices of a complemental screw.

2. A screw accommodating expansion insert in accordance with claim 1, wherein the hollow shank portion presents a periphery which is polygonal in cross-section.

3. A screw accommodating expansion insert in accordance with claim 1, wherein the means for operatively coacting with thread helices of a complemental screw consists of struck out portions of the shank stock circumferentially spaced and in helical alignment.

4. A screw accommodating expansion insert in accordance with claim 1, wherein the ring member is mounted by inwardly bent portions on said shank consisting of a plurality of circumferentially disposed independently flexible tabs.

EDMOND C. CROWTHER.

REFERENCES CITED

The following references are of record in the file of this patent:

UNITED STATES PATENTS

| Number | Name | Date |
|---|---|---|
| 1,095,366 | Abbott | May 5, 1914 |
| 1,169,693 | Swedlund | Jan. 25, 1916 |
| 1,203,546 | Parsons | Oct. 31, 1916 |
| 1,342,738 | Burke | June 8, 1920 |
| 1,784,755 | Rosenberg | Dec. 9, 1930 |
| 1,940,413 | Gray | Dec. 19, 1933 |

FOREIGN PATENTS

| Number | Country | Date |
|---|---|---|
| 7,891 | Austria | Feb. 1, 1902 |